United States Patent [19]
Santucci

[11] Patent Number: 4,668,468
[45] Date of Patent: May 26, 1987

[54] REACTIVITY CONTROL OF NUCLEAR FUEL PELLETS BY VOLUMETRIC REDISTRIBUTION OF FISSILE, FERTILE AND BURNABLE POISON MATERIAL

[75] Inventor: Joseph Santucci, Los Altos, Calif.

[73] Assignee: Electric Power Research Institute, Inc., Palo Alto, Calif.

[21] Appl. No.: 616,477

[22] Filed: Jun. 1, 1984

[51] Int. Cl.⁴ .............................................. G21C 3/00
[52] U.S. Cl. .................................. 376/419; 376/414; 376/416; 376/417
[58] Field of Search ................ 376/414, 416, 417, 419

[56] References Cited

U.S. PATENT DOCUMENTS 3,042,598 7/1962 Crowther ............................ 376/419
3,427,222 2/1969 Biancheria ......................... 376/419

FOREIGN PATENT DOCUMENTS 54-150582 11/1979 Japan ................................. 376/419

Primary Examiner—Donald P. Walsh
Attorney, Agent, or Firm—James P. Hillman

[57] ABSTRACT

A fuel pellet for a nuclear core fuel rod for use in a nuclear reactor fuel assembly having a predetermined radial distribution of burnable poison, fertile, and fissile nuclear material to provide the desired control of reactivity of the fuel pellet with the minimum amount of burnable poison material and to provide control of the nuclear reactivity of the fuel assembly.

2 Claims, 7 Drawing Figures 26
22
24

42
46
44

32
36
34

52
58
54
56

REACTIVITY CONTROL OF NUCLEAR FUEL PELLETS BY VOLUMETRIC REDISTRIBUTION OF FISSILE, FERTILE AND BURNABLE POISON MATERIAL

This invention was made under contract with or supported by the Electric Power Research Institute, Inc.

BACKGROUND OF THE INVENTION

1. Field of the Invention:

The invention relates in general to a fuel pellet for a fuel rod of a fuel assembly of a nuclear reactor core and in particular to a fuel pellet having fissile, fertile, and burnable poison material disposed at predetermined radial locations within the fuel pellet.

2. Description of the Prior Art:

To generate a predetermined amount of energy, a fuel assembly is loaded with fuel rods which include pellets enriched in fissile material (for instance, $UO_2$ pellets enriched in $U_{235}$). The nuclear reactivity (known in the art as K which is defined as the number of fissions in one generation divided by the number of fissions in the preceeding generation) of such an assembly is highest at the beginning of life and lowest at the end. To produce a certain fission rate at the end of life, excess enriched material is provided at the beginning of life. The reactivity of the assembly must be kept within tolerable limits at all times. The most limiting condition is early in the life of the core, since the reactor control system may not have sufficient nuclear worth to maintain the core subcritical by a certain margin in the cold condition due to the high reactivity of the fuel. The reactivity of the fuel assembly can be controlled by fuel rods having fuel pellets containing a burnable poison dispersed therein. The burnable poison is added in sufficient quantity to suppress the reactivity of the fuel to a level consistent with the capabilities of the reactor control system so that the reactor safety design criteria can be met. The burnable poison fuel rods are located in the interior of the fuel assembly so that the burnable poison does not become prematurely depleted, and so that the nuclear interaction between the control rods in the reactor and the burnable poison fuel rods is minimized. The fuel pellets containing the burnable poison are a homogeneous mixture of fissile and fertile nuclear materials and burnable poison materials. The powders containing these materials are blended and mixed in a manner to promote maximum dispersal of the materials into a homogeneous mixture. The burnable poison material tempers the excess reactivity of the enriched materials by absorbing neutrons throughout the lifetime of the fuel assembly. However, it is only necessary to restrain the excess reactivity of the fuel assembly near the beginning of the fuel cycle. Thereafter the excess burnable poison materials that are necessary to temper the reactivity of the fuel assembly near the beginning of the cycle continue to decrease the reactivity and the power output of the fuel assembly throughout the lifetime of the fuel assembly long after the beneficial control at the beginning of the cycle is necessary. The neutron absorption strength of the burnable poison is proportional to the concentration of the burnable absorber and the surface area of the absorbing material. Under the teachings of current state of the art, the concentration of the burnable neutron absorber at the beginning of life of the fuel assembly is selected so that enough burnable poison atoms are available in the proximity of the absorbing surface to maintain the reactivity of the fuel assembly below a predetermined value at some point in time in the life of the fuel assembly. For example, for boiling water reactors, the most limiting condition from a nuclear safety design point of view occurs after a few months of operation in the first cycle, somewhere towards the middle of the cycle. The rate of burnable poison depletion is controlled by increasing or decreasing the number of fuel rods which include the poison atoms (i.e. increasing or decreasing the absorbing surface area). Accurate and optimized control of reactivity is difficult to achieve. As the number of burnable poison fuel rods is increased while decreasing the absorber concentration per rod (a situation which favors rapid depletion of the poison and reduced end of cycle reactivity penalties) the power distribution within the assembly early in life becomes more distorted as the power generated in the peak rod increases relative to the average power in the assembly, trending towards unacceptable regions based on thermal hydraulics and nuclear design and safety considerations. Alternatively, as the number of burnable poison fuel rods is decreased (i.e. the burnable poison atoms are concentrated at few locations) the depletion rate of the poison is reduced and the end of cycle residual poison reactivity penalties are increased. These penalties are compensated for by increasing the enrichment of fissile material within the fuel assembly which, accordingly, corresponds to higher costs for the fuel assembly. Therefore it would be desirable to have a means for minimizing the amount of burnable poison material that is necessary to be disposed within the fuel assembly and for controlling the reactivity of the fuel assembly without increasing the number of burnable poison fuel rods. It would further be desirable to have a means to control the reactivity of the nuclear fuel assembly without the use of burnable poison material.

SUMMARY OF THE INVENTION

Briefly, the present invention is a novel fuel pellet for a fuel rod of a nuclear reactor fuel assembly having a body containing a mixture of nuclear fuel material and a burnable poison material and a means for controlling the radial disposition of the burnable poison material, the fissile material, and the fertile material within the body to minimize the amount of burnable poison material necessary to control the reactivity of the fuel pellet to provide for control of the K value of the fuel assembly and to optimize the amounts of fissile and fertile material necessary for a given power output. The burnable poison material may be disposed at a predetermined radial location by means of the body of the nuclear fuel pellet having both an inner part and an outer part integral with and surrounding the inner part. The inner or the outer part, or both, may have the homogeneous mixture of the burnable poison material with the nuclear fuel material.

The present invention teaches 3 pellet designs: (A) a fuel pellet in which all of the fissile material and all of the burnable poison material are homogeneously mixed with fertile material and segregated to the outer part of the pellet and surrounding an inner part in which only natural or depleted nuclear material is present; (B) a fuel pellet in which both the inner and the outer parts contain a mixture of fissile, fertile, and burnable poison material but the concentration of each in either part is different; (C) a fuel pellet in which only natural or depleted nuclear material is included in the outer part, and enriched nuclear material comprises the inner part.

The fuel pellets A, B and C constructed according to the teachings of the invention may be disposed within a tubular fuel rod cladding to provide a fuel rod that will limit the reactivity of a fuel assembly at the beginning of a cycle. The fuel assembly may be designed with combinations of fuel rods and the individual fuel rods may contain combinations of fuel pellets. The fuel rod may be located within the fuel assembly both in the interior and at the periphery of the fuel assembly as will be explained further in the detailed description of the preferred embodiments.

BRIEF DESCRIPTION OF THE DRAWINGS

The invention may be understood and further advantages and uses thereof more readily apparent, when considered in view of the following detailed description of exemplary embodiments, with the accompanying drawings in which.

DESCRIPTION OF THE PREFERRED EMBODIMENTS

Figure 1:
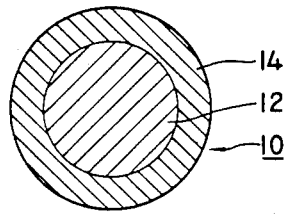
FIG. 1 is a top plan view of a fuel pellet constructed according to the teachings of the invention.
Figure 2:
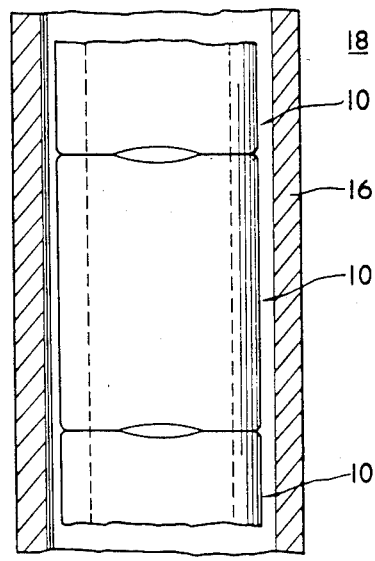
FIG. 2 is a vertical section taken through a fuel rod constructed according to the teachings of the invention showing a number of fuel pellets therewithin.

Referring now to the drawings and to FIGS. 1 and 2 in particular there is shown fuel pellet 10 constructed according to the teachings of the invention. Fuel pellet 10 includes an inner part 12 and an outer, annular, part 14 surrounding part 12 and being of substantially the same length as the latter. The typical length of the pellet is ½ inch to 1 inch; a typical range for the outer diameter of part 14 is 0.30 inch to 0.50 inch and a typical diameter is 0.48 inch. A typical range for the diameter of part 12 is such that the volume of outer annulus 14 is 25 to 50 percent of the volume of interior part 12. Parts 12 and 14 are of integral construction containing fuel of different physical characteristics.

In forming fuel pellet 10, blending and mixing of the nuclear fuel and burnable poison materials is done in a manner to promote maximum homogenous dispersal of the different types of starting powders. The starting powder mixture will therefore be as homogeneous as possible prior to pellet pressing. Typically, after mechanically mixing and blending the appropriate physical powders for each of parts 12 and 14, the fuel pellet is compacted by cold pressing and then is sintered at an elevated temperature to form the final shape of the pellet. During this pressing and sintering, the separate powders will not substantially migrate into each other and thus part 12 and part 14 will be substantially composed of the materials set forth in the above examples.

The teachings of the invention are that by repositioning the nuclear fissile material, the nuclear fertile material, and the nuclear poison material within the pellet in two regions, and by adjusting the volume fractions of the inner and outer regions, it is possible to control the nuclear reactivity (K) of the fuel pellet throughout life. The precise disposition of the nuclear materials allows a minimum of burnable poison to be used for maintaining (K) below a predetermined value at a predetermined time in the life of the fuel. Further, the new fuel pellet designs may be placed at the periphery of the fuel assembly which allows improvements in the power distribution throughout the assembly (e.g. a more uniform power distribution).

As will be explained later, the present invention is not limited to any one or several physical arrangements or fuel mixtures or even any particular mixture of fuel and burnable poison. However, three preferred embodiment mixtures and arrangements have been determined to be of particular usefulness and will be set forth in the following three examples relative to the structure of fuel pellet 10 in FIGS. 1 and 2:

EXAMPLE A

The fuel content of part 12 is a mixture of natural or depleted nuclear fuel material and the fuel content or part 14 is a homogeneous mixture of gadolinium oxide and enriched nuclear fuel material. The diameter of part 12 for example A will generally range from 40 to 75 percent of the diameter of part 14.

EXAMPLE B

The fuel content of part 12 includes a homogeneous mixture of gadolinium oxide and enriched nuclear fuel material which may again be a mixture of both uranium oxide and plutonium oxide, and the fuel content of part 14 contains a homogeneous mixture of gadolinium oxide and enriched nuclear fuel material. The concentrations of gadolinium and fissile material in the inner part differs (for example substantially lower) from that in the outer part. The diameter of part 12 for example B may range from 40 to 75 percent of part 14.

EXAMPLE C

The fuel content of part 12 includes a homogeneous mixture of enriched nuclear fuel, such as for example a mixture of uranium oxide and plutonium oxide, and the fuel content of part 14 includes a homogeneous mixture of either natural or depleted nuclear fuel material. The diameter of part 12 in example C may range from 40 to 85 percent of the diameter of part 14.

After formation, the fuel pellets 10 can be arranged in the manner shown in FIG. 2 in a fuel rod cladding 16 so as to provide fuel rod 18 which may then be combined with a multiplicity of other fuel rods to provide a nuclear fuel assembly.

Figure 3:
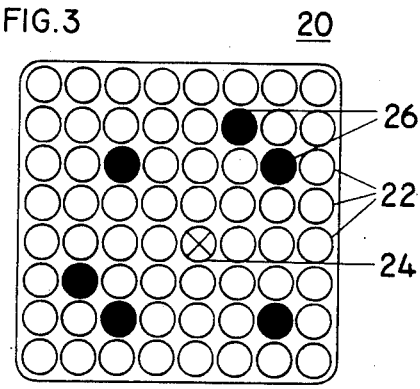
FIG. 3 is a schematic diagram of a typical nuclear fuel assembly constructed according to the teachings of the prior art.

Referring now to FIG. 3 there is shown a schematic view of a typical nuclear fuel assembly 20 of the prior art. Fuel assembly 20 includes enriched $UO_2$ fuel rods 22 and a water rod 24. Fuel rods containing fuel pellets having a homogeneous mixture of nuclear fuel materials such as, for example, enriched $UO_2$ and a burnable poison such as, for example, $Gd_2O_3$ are dispersed more or less uniformly throughout the nuclear fuel assembly as shown by fuel rods 26.

Figure 4:
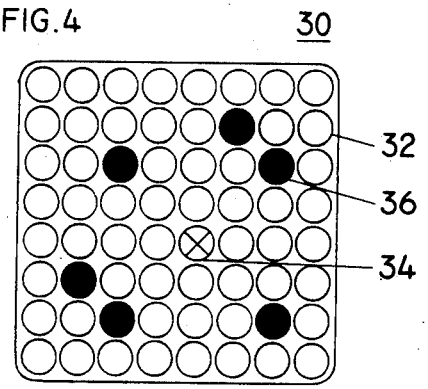
FIG. 4 is a schematic diagram of a typical nuclear fuel assembly constructed according to the teachings of the invention.

Referring now to FIG. 4, if fuel rods 26, constructed according to the teachings of the prior art, were removed and replaced with fuel rods containing fuel pellets constructed according to the teachings of the invention, there would be nuclear fuel assembly 30 having enriched $UO_2$ fuel rods 32, a water rod 34 and fuel rods 36 constructed according to the teachings of the invention. Fuel rods 36 now contain fuel pellets 10, constructed according to the teachings of the invention, according to the physical constituent selection of example A. When all the fissile $U_{235}$ (enriched $UO_2$) and Gd atoms are redistributed into part 14 of fuel pellets 10 of fuel assembly 30, it is found that by changing the volume fraction of part 14 the K value of the assembly can be controlled. The smaller the volume fraction of part 14 is, the higher the absorbing strength of fuel rod 36 is early in life. In addition, as the absorbing strength increases, the Gd depletion rate decreases early in life and increases later in life for fuel rod 36. Because of the increased reactivity control capabilities, the volume fraction of part 14 in pellets 10 for fuel rod 36 can be selected to minimize the requirements for gadolinium atoms in fuel assembly 30, based on a given margin to shutdown in the cold condition. The preferred embodiment is for part 14 of pellets 10 in fuel rod 36 to occupy 25 to 50 percent of fuel pellet volume.

As mentioned earlier when the fuel rods containing fuel pellets having a homogeneous mixture of nuclear fuels and burnable poison are disposed such as in FIG. 3, a substantial amount of burnable poison must be used so as to provide enough control of the reactivity of the nuclear fuel assembly during the beginning of a cycle of the fuel assembly. The gadolinia burnable poison is a strong absorber of thermal neutrons. The gadolinium isotopes which have very high neutron absorption cross sections are the odd numbered isotopes (Gadolinium 155 and 157). Even numbered isotopes have much lower, though not negligible, absorption cross sections. Therefore, early in life it is the concentration of odd numbered Gadolinium isotopes which is primarily responsible for controlling the reactivity of the burnable poison rod and therefore the fuel assembly. Later in life, the even numbered gadolinium isotopes will be more controlling. Early in life the gadolinium atoms in the interior of the fuel pellet are shielded by those at the periphery. The rate of absorption is therefore controlled to a certain extent by the outer surface area and gadolinium concentration in the proximity of the outer surface.

Figure 5:
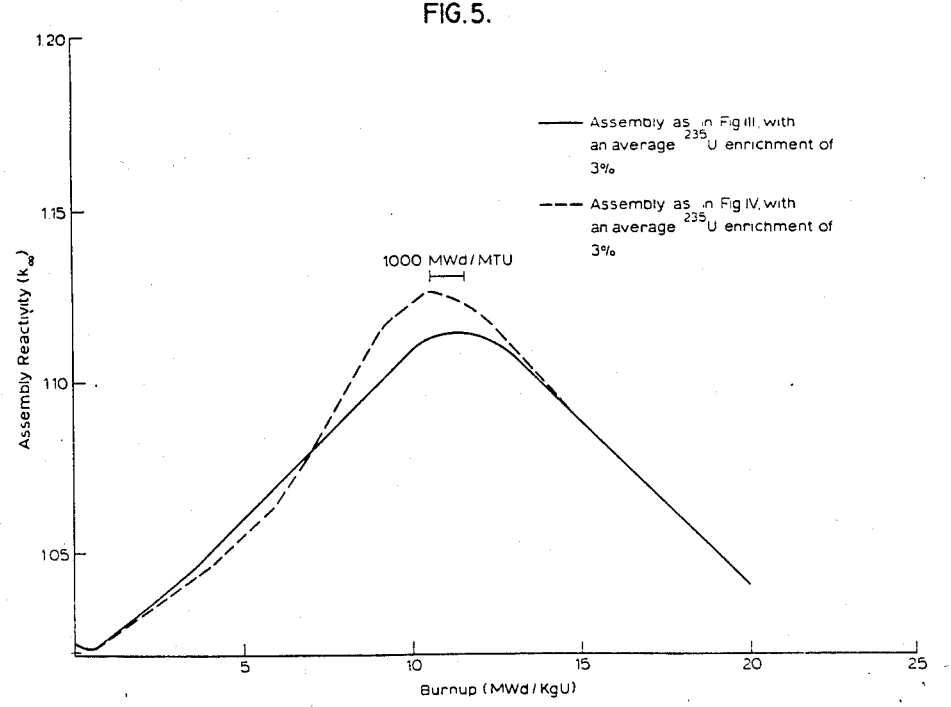
FIG. 5 is a graph of the nuclear performance of a typical nuclear fuel assembly of the prior art and of a typical fuel assembly constructed according to the teachings of the invention.

As the gadolinium is depleted, the absorbing surface will move from the periphery of the pellet to the interior. Since, as stated previously, reactivity control is necessary only early in the life of the fuel assembly, the gadolinia poison at the center of the pellet is an unnecessary burden to the reactivity of the assembly later in life. This burden is compensated for in prior art fuel assembly designs by increasing the enrichment of the fissile material of the assembly. In this present invention, it is found that by repositioning the burnable poison material within the pellet, less total amount of burnable poison atoms are required to control the reactivity by a given amount. Therefore, the fissile enrichment requirements of the assembly can be lowered and still produce the same amount of energy. For example, if in a 3.0% average $U_{235}$ enrichment $8 \times 8$ fuel assembly designed to include six fuel rods to which 5% $Gd_2O_3$ have been uniformly admixed to the $UO_2$, the burnable poison rods of the prior art are exchanged (according to the teachings of the present invention) for rods containing pellets of design A above, comprising a natural uranium core occupying 50% of the volume of the pellet and an outer annulus occupying the remaining 50% of the volume and which outer annulus includes enriched $U_{235}$ such that the total number of $U_{235}$ atoms is not changed from the burnable poison rods of the prior art, and $Gd_2O_3$ uniformly admixed so that the same number of gadolinium atoms is used relative to the burnable poison rods of the prior art, then it is found that during the first irradiation cycle of the assembly, and up to a burnup of 7 MWd/KgU, the reactivity of the new fuel assembly is less than that of the reference assembly containing the burnable poison rods of the prior art, and beyond 7 MWd/KgU it is more. This is shown in FIG. 5 wherein there is shown a graph of the assembly reactivities ($K_\infty$) of a fuel assembly of the prior art and a fuel assembly constructed according to the teachings of the invention. It is clear that all the odd numbered gadolinium isotopes in the assembly containing pellets of design A deplete approximately 1 MWd/KgU earlier than for the assembly of the prior art. Therefore end of cycle residual poison penalties are reduced. Further, since in a typical application the most limiting condition from a shutdown margin point of view is between 3-5 MWd/KgU, and since, as shown in FIG. 5, the reactivity of the assembly with pellets A is less than the prior art assembly in this range, the concentration of gadolinia in pellet A could be reduced to match the K of the prior art assembly. The reduction would further decrease end of cycle residual poison penalties, and increase the K of the assembly later in life (beyond 10 MWd/KgU) since fewer even numbered gadolinium isotopes are present. By use of pellet design A it is also found that because the surface concentration of gadolinia in the outer shell is higher than for a homogeneous pellet, the fuel is less sensitive to changes in thermal neutron flux. This is very advantageous since the most limiting condition for reactor control is is the cold (shutdown) condition, where the thermal neutron flux is higher. This means that a reduction in the gadolinia concentration of pellet A has a smaller impact on the K of the fuel in the cold condition than reference assembly 20. Therefore it is estimated that with approximately 20% less gadolinium atoms, assembly with pellets A will have equivalent shutdown margin to the reference assembly. That is to say that the concentration of gadolinia in the outer annulus which occupies 50% of the volume need be only about 8%. The reduced number of gadolinium atoms employed reduces the reactivity burden of the assembly later in life such that simply by substituting pellets 10 having the constituency of example A of this invention for the pellets of the prior art, the enrichment of the assembly can be reduced to about 2.9% $U_{235}$ while still generating the same amount of energy as the current assembly.

Figure 6:
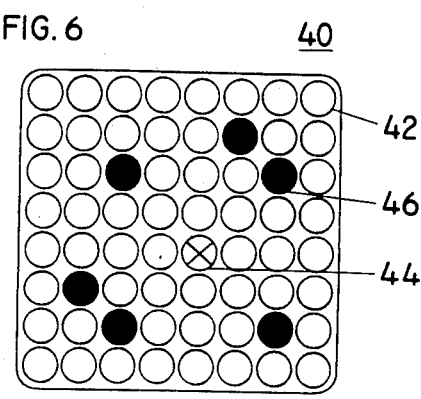
FIG. 6 is a schematic diagram of a typical nuclear fuel assembly constructed according to the teachings of the invention.

Shown in FIG. 6 is nuclear fuel assembly 40 having enriched $UO_2$ fuel rods 42, a water rod 44 and fuel rods 46 containing fuel pellets 10 constructed according to the teachings of the invention and having the consistency of example B. If fuel pellet B (fuel pellet 10 having the consistency of example B) is constructed as pellet A (fuel pellet 10 having the consistency of example A), but with a small amount of fissile and gadolinium atoms in the center part of the pellet, than for equivalent volume fractions of part 14 of pellets A and B and for equivalent number of fissile and gadolinium atoms, the reactivity of fuel assembly 40 will be similar to that of fuel assembly 30 early in life, and less later in life. Alternatively, if more gadolinium and fissile atoms are placed in center part 12 than in part 14 of pellet 10 in fuel rod 46, than the reactivity of fuel assembly 40 can be made to be more than that of fuel assembly 30 early in life and less later in life.

From the above discussion, it is clear that with pellet design A the reactivity of the fuel assembly can be controlled by changing the volume fraction of part 14 in pellet 10 and accordingly adjusting the concentration of fissile and gadolinium atoms in part 14 so that the average pellet concentration is unchanged. It is also clear that with this method reactivity control is accomplished without changing the number of fuel rods in the assembly containing burnable poison atoms. As described in the example, the properties of pellet A can be used to minimize the amount of burnable poison atoms necessary to maintain K value of the assembly below a given value at a given time in the life of the assembly. The invention further teaches that additional control, if needed, can be obtained with pellets of design B. However, more burnable poison atoms are required for pellet B than for pellet A, but less than for the fully homogeneous pellets of the prior art.

Figure 7:
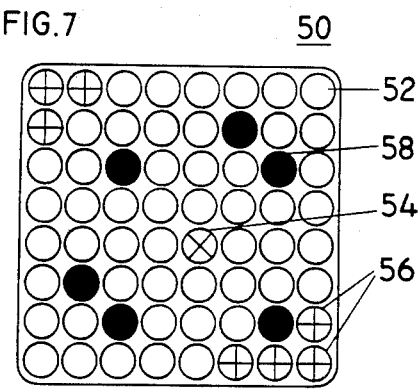
FIG. 7 is a schematic diagram of a BWR control blade and a typical nuclear fuel assembly constructed according to the teachings of the invention.

Referring now to FIG. 7, there is shown nuclear fuel assembly 50 having enriched $UO_2$ fuel rods 52, a water rod 54 and fuel rods 56 containing fuel pellets 10 constructed according to the teachings of the invention and having the constituency of example C. Fuel rods 56 may be located at the periphery of the fuel assembly. For application in a BWR fuel assembly they are especially beneficial if located adjacent to or diametrically opposite from a neighboring control blade of the nuclear reactor. This is because the fertile material in part 14 of fuel pellet 10 dampens the number of fissions in part 12 which are due to increases in the number of thermal neutrons in the vicinity of fuel rod 56. The amount of dampening is controlled by changing the thickness of the annulus 14. In a BWR, this feature is particularly useful if rods 56 are located at the periphery of the fuel assembly next to a control blade. The power level of these fuel rods will respond less quickly to control blade movements and therefore improve the safety design of the fuel assembly. At peripheral locations in the assembly, fertile material in region 14 of fuel pellets in rod 56 will be converted to fissile material more rapidly than if the same rods were in the interior of the assembly, due to the higher density of thermal neutrons at the periphery. In this fuel assembly 50 the natural uranium oxide in outer part 14 becomes enriched in plutonium during irradiation therefore provides a reactivity dampening affect at the beginning of the lifetime of the fuel assembly which decreases during use. That is to say, relative to a standard, fully homogeneous pellet, pellet C has a lower nuclear reactivity early in life and a much higher one later in life. The rate of fissioning in pellet C can be controlled by changing the thickness of the outer annulus. When the volume fraction part 14 is properly adjusted and the number and locations of such pellets within the assembly properly determined, than it will be seen that less burnable poison atoms will be necessary in the fuel assembly for a given shutdown margin requirement. Fuel rods containing burnable poison pellet design A or B or other constituency may be located within the interior of fuel assembly 50 as shown in FIG. 7 at 58. The location, nuclear materials and amount of rods 58 are discretionary.

Fuel assembly 30, may be designed with combinations of fuel rods and the individual fuel rods may contain combinations of fuel pellets according to the teachings of the invention.

For all of the above preferred embodiments and examples of nuclear fuel material and burnable poison material constituencies, it can be appreciated that the various nuclear fuel assemblies according to the teachings of the present invention can use less enriched nuclear fuel material or can operate for a longer time having a greater lifetime power output with the same amount of enriched materials. It also can be appreciated that the teachings of the invention are not limited to any particular pellet construction or material selection or combination, but rather are broadly applicable to minimizing burnable poison material for controlling the reactivity of a nuclear fuel assembly by predetermining radial disposition of the fissile, fertile and burnable poison material within the fuel pellet. The present invention presents a novel way of controlling the rate of fissions and neutron absorption through adjustments of the chemical and fissile element composition as a function of radial position in a nuclear fuel pellet.

The present invention further teaches how, by means of fuel pellets A, B and C the reactivity of the assembly can be controlled more precisely and with a reduced amount of burnable poison atoms than would be necessary with current design (fully homogeneous) pellets.

With pellet design A, by decreasing the fraction of the volume of the outer part (which includes, for example, enriched $UO_2$ and $Gd_2O_3$) the concentration of fissile material (for example $U_{235}$) and burnable poison material is increased in this region since atoms of both types are being redistributed from throughout the pellet to a smaller volume. It is found that because of this redistribution, the strength of the absorber is increased early in life and the rate of depletion of the absorber is decreased early in life and increased later in life. The smaller the volume of the outer part, the more pronounced the effect. This means that less burnable poison atoms need be used to maintain the reactivity of the assembly below a given value at at point in time in the life of the fuel. This, in combination with the faster poison depletion rate later in life, results in reduced end of cycle residual poison penalties. Accordingly, by means of pellet design A, the enrichment of the assembly can be reduced for a given energy generation requirement.

Pellet design B, allows control of the reactivity of the fuel over a wider range of time than pellet design A, should this be required. For example, if a small amount (i.e. low concentration) of burnable poison and fissile atoms are added to the interior part of pellet A to produce a new pellet B, early in life the reactivity characteristics will be similar to those of pellet A; but later in life the reactivity will be slightly less due to the neutron absorbing contribution of the inner part. Pellet design B, allows less of a reduction in end of cycle residual poison penalties than pellet design A, but it is still an advantage over the standard, fully homogeneous, pellets of current use. There may be instances of practical application in which use of pellet design B provides a significant advantage.

Pellet design C, exhibits a lower reactivity at the beginning of the fuel cycle and higher reactivity later in the fuel cycle relative to a standard pellet of equivalent enrichment. Early in life, the fertile material in the outer part shields partially from thermal neutrons the fissile material in the inner part, thereby depressing the reactivity of the fuel. During irradiation, the fertile material is converted to fissile material which contributes to power generation both directly and indirectly. The rate of relative reactivity increase over the lifetime of the fuel can be controlled by increasing or decreasing the pellet volume fraction of the outer part (and correspondingly increasing or decreasing the concentration of fissile material in the inner part so that the pellet average fissile enrichment is unchanged) and by placing the pellets in low or high thermal nuetron flux locations within the assembly. Pellet design C provides a very desirable effect when used at selected locations of the fuel assembly since the decreased reactivity of the pellet early in life decreases the reactivity and therefore the burnable poison requirements of the fuel assembly. The decreased reactivity early in life is recovered later in life as pellets of design C increase power generation, so as a net result the assembly operates with a more constant reactivity throughout life with reduced burnable poison. Pellet C can provide for significant economic, safety, nuclear, and assembly thermal hydraulic benefits when used at selected locations within standard design fuel assembly or assemblies which include advanced features such as pellet design A or B.

The invention teaches that if in an assembly of standard design all the fuel pellets which include a homogeneously distributed burnable poison are substituted by pellets of design A or B above and all the fissile atoms and the burnable poison atoms are conserved in the substitution, than it will be found that: (1) the reactivity of the assembly can be controlled during the first cycle of irradiation by changing the volume fraction distribution of pellets A or B without increasing or decreasing the number of fuel rods in the assembly which include a burnable poison material, (2) due to the higher burnable poison depletion rate later in life, end of first residual poison penalties are decreased, (3) the improved control of reactivity with pellets A or B can be used to decrease the number of burnable poison atoms necessary and this in turn also reduces the end of cycle residual poison penalties which allows a reduction of the enrichment requirement of the fuel assembly. The increased reactivity control capabilities with pellets A or B affords increased flexibility of assembly design which can yield increased benefits since more locations within the assembly lattice are available for placement of burnable poison fuel rods.

The invention further teaches that use of pellet design C in selected assembly lattice locations (for example at the periphery of a BWR fuel assembly) provides a very desirable effect of controlling the reactivity of the assembly throughout life and with reduced burnable poison.

What is claimed is:

1. A fuel pellet for a nuclear fuel assembly fuel rod, comprising:

a body having an inner portion disposed within an outer annular portion integral with and surrounding said inner portion, said inner portion being formed from compacted natural uranium oxide powder alone and said outer annular portion being formed of compacted mixtures of enriched uranium oxide and gadolinium oxide powders to provide a fuel pellet that has a lower reactivity than a conventional homogeneously mixed pellet at the beginning of life and a higher reactivity than a conventional homogenously mixed pellet at the end of life.

2. A nuclear fuel pellet for a nuclear fuel assembly fuel rod, comprising:

a body having an inner part and an outer part integral with an surrounding said inner part, said inner part containing enriched nuclear fuel material and said outer part containing only natural nuclear fuel material to provide a fuel pellet that has a lower reactivity than a convnetional homogenously mixed fuel pellet at the beginning of life and a higher reactivity than a conventional homogenously mixed fuel pellet at the end of life.

* * * * *